United States Patent [19]

Stinson et al.

[11] 4,217,128
[45] Aug. 12, 1980

[54] PRODUCTION OF UREA-AMMONIUM POLYPHOSPHATES FROM UREA PHOSPHATE

[75] Inventors: John M. Stinson, Sheffield; Horace C. Mann, Jr., Killen; John F. McCullough, Florence, all of Ala.

[73] Assignee: Tennessee Valley Authority, Muscle Shoals, Ala.

[21] Appl. No.: 57,247

[22] Filed: Jul. 13, 1979

Related U.S. Application Data

[63] Continuation-in-part of Ser. No. 883,990, Mar. 6, 1978, abandoned, which is a continuation of Ser. No. 838,503, Oct. 3, 1977, now Defensive Publication No. T973,004.

[51] Int. Cl.$^2$ .......................... C05P 7/00; C05P 13/00
[52] U.S. Cl. .................................. 71/29; 260/555 R; 423/308; 423/312; 423/315
[58] Field of Search ...................... 71/29, 28, 30, 64 C, 71/64 D; 260/555 R; 423/309, 306, 312, 302, 308, 315

[56] References Cited

U.S. PATENT DOCUMENTS

| | | | |
|---|---|---|---|
| 3,382,059 | 5/1968 | Getsinger | 423/302 X |
| 3,713,802 | 1/1973 | Gittenait | 71/29 |

FOREIGN PATENT DOCUMENTS 2308408  8/1974  Fed. Rep. of Germany.

OTHER PUBLICATIONS

Veda; Chem. Abstracts 60: 3098e; Kogyo Kagaku Zasschi 66(5), 586–589 (1963).

Primary Examiner—Kenneth M. Schor
Attorney, Agent, or Firm—Robert A. Petrusek

[57] ABSTRACT

Crystalline urea phosphate is pyrolyzed in one stage to give molten urea ammonium polyphosphates that contains up to 95 percent of the phosphate as polyphosphate. These are then processed into high-analysis solid or liquid fertilizers. Addition of urea to the process to maintain a urea:biuret ratio of at least 16 prevents precipitation of biuret in the liquid fertilizers.

3 Claims, 5 Drawing Figures

PRODUCTION OF HIGH-PURITY UREA-AMMONIUM POLYPHOSPHATE LIQUID FERTILIZER BY THERMAL DECOMPOSITION OF UREA PHOSPHATE

Fig. 1

PRODUCTION OF HIGH-PURITY UREA-AMMONIUM POLYPHOSPHATE LIQUID FERTILIZER BY THERMAL DECOMPOSITION OF UREA PHOSPHATE

Fig. 2

PRODUCTION OF GRANULAR HIGH-PURITY UREA-AMMONIUM POLYPHOSPHATE SOLID FERTILIZER BY THERMAL DECOMPOSITION OF UREA PHOSPHATE

DISTRIBUTION OF ORTHOPHOSPHATE AND POLYPHOSPHATE SPECIES AS RELATED TO THE AVERAGE CHAIN LENGTH n̄ IN PYROLYZATES OF UREA PHOSPHATE

Fig 3

UNLOADING DEVICE TO REMOVE MOLTEN UAPP FROM PYROLYSIS REACTOR

Fig. 4

EFFECT OF UREA PHOSPHATE PYROLYSIS TEMPERATURE AND RETENTION TIME ON POLYPHOSPHATE LEVEL IN UREA AMMONIUM POLYPHOSPHATE LIQUIDS

Fig. 5

PRODUCTION OF UREA-AMMONIUM POLYPHOSPHATES FROM UREA PHOSPHATE

This application is a continuation-in-part of application Ser. No. 883,990, filed Mar. 6, 1978 and now abandoned; which in turn is a continuation of application Ser. No. 838,503, filed Oct. 3, 1977 and now Defensive Publication number T973004.

Our invention relates to an improvement in liquid and solid fertilizers containing polyphosphate and an improved process of production; more particularly it relates to a process for the manufacture of highly concentrated liquid and solid mixed fertilizers produced from phosphoric acid of the wet-process type and urea; and more particularly to the production of such highly concentrated liquid and solid mixed fertilizers containing polyphosphates by the pyrolysis of urea phosphate wherein the previously required separate step of concentrating said wet-process phosphoric acid up to the range of superphosphoric acid to form polyphosphate followed by ammoniation of said superphosphoric acid and then addition of urea to form urea-ammonium polyphosphate is entirely eliminated; said process for the production of urea-ammonium polyphosphate characterized by the fact that the product therefrom is substantially free from unavailable $P_2O_5$ and that said process can be operated under a variety of conditions so as to produce solid or liquid fertilizers of almost any desirable polyphosphate level. The necessary pyrolysis conditions to give the desired polyphosphate content can be obtained by continuous pyrolysis in one stage. Still more particularly our invention relates to a process for the production of urea-ammonium polyphosphate liquids in which the troublesome precipitation of biuret is not encountered.

Liquid mixed fertilizers having compositions similar to those of standard dry mixed fertilizers are well known in the industry and are increasing in popularity. Such solutions have the advantage over dry mixed fertilizers in that costs of evaporating water and bagging are eliminated and application to the soil is greatly simplified. Moreover, the use of liquid fertilizers eliminates difficulty due to segregation and caking often encountered in the storing of dry fertilizers. However, liquid fertilizers in the past have had some outstanding disadvantages. Water-soluble materials of relatively high cost had to be used to obtain precipitate-free solutions and the solutions produced were oftentimes so corrosive as to result in high maintenance and storage costs. The solutions also, in the past, have been limited to a maximum plant food content of about 33 percent by weight because experience has taught that concentration in excess of this amount has resulted in crystallization and precipitation of salts. Even then, raw materials of high purity had to be used to prevent precipitation of salts at lower plant food contents. For example, satisfactorily clear liquid fertilizers could not be produced with the popular wet-process phosphoric acid even at very low plant food contents.

One of the breakthroughs in overcoming disadvantages in liquid mixed fertilizers is taught and described in U.S. Pat. 2,950,961, Striplin et al. Striplin has discovered that he is able to prepare a liquid mixed fertilizer containing substantial values of both N and $P_2O_5$ in a process wherein he rapidly and intimately introduces ammonia and superphosphoric acid into a reaction vessel under controlled conditions. As is taught by Striplin, the superphosphoric acid utilized in his process is ammoniated in such a way that the resulting ammonium polyphosphate salts which comprise his liquid fertilizers are proportioned in his product in substantially the same dependent and proportional relationship as are the various species of polyphosphoric acids originally present in his superphosphoric acid constituent. It is believed that the reduction of these species of polyphosphoric acid as the ammonium salts thereof is beneficial in restraining the precipitation of salts in his product solution.

In another breakthrough in overcoming the disadvantages of liquid mixed fertilizers produced by the prior-art methods, there is found in application Ser. No. 835,377, John G. Getsinger, assigned to the assignee of the present invention (now abandoned), the discovery that if phosphoric acid of the wet-process type is subjected to evaporating means, either at atmospheric or at reduced pressure, so as to condense the wet acid and raise its $P_2O_5$ content up to as high as 76 percent $P_2O_5$, the formation of gelatinous precipitates which otherwise render wet-process phosphoric acid unusable for the preparation of high-analysis liquid mixed fertilizers are substantially sequestered. In addition, there is taught in said application that if wet-process phosphoric acid is so concentrated, it may then be subsequently ammoniated to form liquid mixed fertilizers in which the congeneric impurities originally present in said wet-process phosphoric acid are sequestered and caused to remain in solution, thereby eliminating the formation of said gelatinous precipitates. Substantially the same teachings wherein commercial grade wet-process phosphoric acid is concentrated and then subsequently ammoniated to form liquid mixed fertilizers is also found in U.S. Pat. No. 3,044,851, D. C. Young. As may be seen from the disclosures enumerated supra, it is now known in the art how to produce liquid mixed fertilizers having plant nutrient values comparable to many standard dry mixed fertilizers and, in addition, to the preparation of said liquid fertilizers by such means and in such forms so as to substantially overcome many of the disadvantages originally inherent in the production of liquid fertilizers prior to the Striplin disclosure. As may also be seen from a consideration of the economics involved, it is, in many cases, more highly desirable to produce such liquid mixed fertilizers by the ammoniation of concentrated wet-process superphosphoric acid rather than from the ammoniation of the cleaner, but more expensive, superphosphoric acid of the electric-furnace type.

In still another breakthrough in overcoming some of the disadvantages of liquid and solid mixed fertilizers produced by the prior-art methods, there is found in U.S. Pat. Nos. 3,171,733, 3,228,752, and 3,264,085, Hignett et al, assigned to the assignee of the present invention, the discovery of new compositions of matter and methods for their production which contain up to about 80 percent of their weight in the form of available plant food and which are produced by a process of directly reacting anhydrous ammonia with superphosphoric acid at elevated temperatures and pressures. These compositions of matter may either be directly applied to the soil as a solid fertilizer or be shipped from the point of manufacture to the intended point of usage and then subsequently simply be dissolved in water, thereby effecting the production of high-analysis liquid mixed fertilizer suitable for application to the soil. In this teaching of Hignett et al, the feed material for the reactor is anhydrous ammonia and superphosphoric acid, either of the electric-furnace type or the wet-process type. In his teachings, polyphosphate is present in the superphosphoric acid prior to ammoniation. This requirement necessitates, when said superphosphoric acid is derived from the leaching of phosphate rock by sulfuric acid, i.e., wet-process acid, of concentrating the ordinary or merchant-grade wet-process acid up to the superphosphoric acid range by means of a separate and fairly costly concentration step in that special equipment and materials of construction must be used to insure against the corrosive characteristics of acid so concentrated, and in the thermal requirements from the fuel to be used therein.

And in still another breakthrough in overcoming some of the disadvantages of liquid and solid mixed fertilizers produced by the prior-art methods, there is found in U.S. Pat. No. 3,382,059, John G. Getsinger, assigned to the assignee of the present invention, the discovery of a process for the production of highly concentrated liquid and solid mixed ammonium polyphosphate fertilizers produced by the ammoniation of phosphoric acid of the wet-process type which overcomes certain of these disadvantages of the prior art and which will greatly influence an economic swing to the use of wet-process acid as the starting constituent rather than the more highly priced electric-furnace type acid. Getsinger has developed a reliable, simple, and efficient method for the production of liquid and solid ammonium polyphosphate fertilizers by utilizing ordinary merchant-grade wet-process phosphoric acid in the $P_2O_5$ content range from about 50 to 58 percent by weight wherein the separate step of subjecting said acid to an evaporating step to increase its $P_2O_5$ content is substantially eliminated, thereby greatly improving on the economics involved.

Further, Getsinger has found that, in carrying out his process for the manufacture of liquid and solid mixed fertilizers by the ammoniation of merchant-grade wet-process phosphoric acid, he can utilize the free heat of ammoniation to evaporate water and form polyphosphates rather than require the use of expensive heat from fossil fuel. In the Getsinger process, a portion of the free water and essentially all of the chemical water is evaporated from the orthophosphoric acid in the second stage; the first stage is used essentially to recover the ammonia evolved from the second stage in order to prevent an ammonia loss from the process, and in so doing, the heat of ammoniation that is generated is used to evaporate free water from the resulting partially ammoniated feed acid. In addition, in his process, the evaporation of water is from a relatively noncorrosive acid salt solution instead of from a highly corrosive acid, thus allowing the use of less expensive materials of construction when carrying out his process.

Subsequently to the original work by Getsinger, it has been discovered by his associates that although the two-stage ammoniation process of Getsinger is a new and useful tool in producing ammonium polyphosphates by a method which substantially eliminates the necessity of first separately concentrating wet-process phosphoric acid from merchant-grade strength up to the superphosphoric acid range it has certain limitations, the greatest of which perhaps is the degree of availability of the total $P_2O_5$ content of the ammonium polyphosphate produced thereby. It should be understood that $P_2O_5$ availability referred to is determined by standard procedures used in the fertilizer industry and defined in the Official Methods of Analysis of the Association of Official Agricultural Chemists, 10th edition, 1965, published by the Association of Official Agricultural Chemists, Washington, D.C.

It has been found that highly desirable products can be produced by the two-stage ammoniation process of Getsinger only when the feed acids contain relatively low metallic impurity contents or low polyphosphate contents. The metallic impurity content may be expressed as the $R_2O_3$:$P_2O_5$ mole ratio wherein $R_2O_3$ symbolizes the weight percent of the total of the two principal metallic impurities, iron and aluminum, reported as their oxides. For example, depending on the maximum operating temperature of the two-stage ammoniation process of Getsinger, it was found that the percentage of $P_2O_5$ availability falls off rapidly from substantially 100 percent when the $R_2O_3$; $P_2O_5$ mole ratio is greater than about 0.04. As a result, undesirable reactions occur with the metallic impurities present in the acid to form compounds that contain substantial portions of the $P_2O_5$ in a form that is unavailable to the growing plant. Thus, for example, in U.S. Pat. No. 3,562,778, Siegel et al., and assigned to the assignee of the present invention, it has been shown that if the ammoniation is carried out in such a manner that, first, a high proportion of the ammonia is fixed while the polyphosphate content is low, then the final dehydration of the orthophosphates is converted to polyphosphates in such a manner that the undesirable reactions that result in the formation of the unavailable $P_2O_5$ do not occur. As a result, Siegel et al. teach a process wherein they can obtain substantially 100 percent $P_2O_5$ availability when the $R_2O_3$:$P_2O_5$ mole ratio in the wet-process phosphoric acid feed is as great as about 0.1.

Another example of improviding upon the basic Getsinger process for ensuring both a high degree of availability of the total $P_2O_5$ content of ammonium polyphosphate product, while at the same time holding the ratio of ammonium polyphosphate to ammonium orthophosphate in said material as high as possible, there is shown in U.S. Pat. No. 3,733,191, R. S. Meline et al, and assigned to the assignee of the present invention, the further discovery that when utilizing the "T" in-line mixer in the pilot plant, as in the process of Siegel et al, the fixation of ammonia prior to dehydration and formation of the polyphosphate is most likely not the only essential mechanism of the reaction. Meline et al concluded that fixation of ammonia, dehydration, and polyphosphate formation must occur simultaneously in their improvement over the basic Getsinger process and the improvement of Siegel et al in order to yield products which consistently have the desired characteristics regardless of the $R_2O_3$:$P_2O_5$ mole ratio when using wet-process phosphoric acid as feed acid to their process. In addition to Meline's use of what amounts to an instantaneous agitation in their mixing "T" to ensure intimate and immediate mixing at the point of fixation of the ammonia, which is also the point of formation of the polyphosphate, they also teach a critically of disengaging water vapor trapped in the form resulting in their process of ammoniation of wet-process phosphoric acid prior to any substantial cooling thereof to ensure both high $P_2O_5$ availability and a high ratio of ammonium polyphosphate to ammonium orthophosphate in their product.

Thus, it may now be seen that, although the basic teaching of Getsinger is in fact a significant and substantial breakthrough which completely eliminates the necessity of first separately concentrating wet-process phosphoric acid from merchant-grade strength up to the superphosphoric acid range prior to the ammoniation thereof to produce ammonium polyphosphate products of highly desired characteristics, it also has been taught that, if the feed acid contains a high ratio of $R_2O_3:P_2O_5$, it is necessary either to fix substantial amounts of ammonia prior to the formation in the product of substantial amounts of ammonium polyphosphate, or to provide both severe and substantial instantaneous mixing to ensure the fixation of ammonia, dehydration of wet-process phosphoric acid so fixed with ammonia, and polyphosphate formation therein occur simultaneously and that the foam resulting therefrom be mechanically treated to disengage water vapor trapped therein prior to any substantial cooling thereof in order to obtain products of the desired characteristics regardless of the impurity of the wet-process phosphoric acid fed to the system.

We have now discovered that although the two-stage ammoniation process of Getsinger is in fact a new and useful tool, and further, that the contributions of Siegel et al and Meline et al, supra, possess considerable advantages thereover and in fact ensure an improved product therefrom regardless of the $R_2O_3:P_2O_5$ ratio in the wet-process feed acid, we are able to use a crystalline urea phosphate which can be produced from urea and relatively inexpensive impure wet-process phosphoric acid of any $R_2O_3:P_2O_5$ mole ratio to produce very high-quality solid and liquid fertilizers that exhibit substantially 100 percent $P_2O_5$ availabilities and that contain very few impurities and almost any desired proportion of polyphosphate in simple and inexpensive equipment without using the acid concentration step necessary in the teachings of Striplin et al or Young, nor using the complicated equipment and procedure taught by Getsinger, nor the involved procedure taught by Siegel et al, nor the mechanical requirements of Meline et al. By utilizing the condensing action of urea in urea phosphate to form polyphosphates, we have discovered a new, novel, and improved method of producing ammonium polyphosphate-type liquid fertilizers.

Thus, it may be seen that our process takes a considerably different approach from these prior-art methods of providing for the production of ammonium polyphosphate materials of both high polyphosphate and $P_2O_5$ availability levels from wet-process phosphoric acids having moderate to high impurity levels. In our process, since the condensing action of the urea is used to form the polyphosphate, it is possible and desirable to operate at low temperatures where $P_2O_5$ availability problems are not encountered but at temperatures where we still obtain a product having a high polyphosphate content, wherein in the prior art this has not heretofore been possible.

The use of urea as a condensing agent per se is not unknown. A rapid search of the literature has revealed several patents or articles in which urea has been used as a condensing agent to form certain polyphosphates. For example, three patents issued to Monsanto Company[1,2,3] describe the production and use of long-chain water-insoluble ammonium polyphosphates by heating urea and ammonium orthophosphate or polyphosphate. These products, however, would not be suitable for use in preparation of clear liquid fertilizers.
[1] Belgian Pat. No. 674,161, Dec. 22, 1965.
[2] Belgian Pat. No. 677,866, Sept. 12, 1966.
[3] Netherlands application No. 6,409,323, Aug. 13, 1964.

In other work, Ueda[4,5] heated phosphoric acid and urea to form a mixture of highly condensed ammonium polyphosphate and water-insoluble cyanuric acid with several subsequent steps involving water and ethyl alcohol addition to separate the polyphosphate. It is well known that to form cyanuric acid along with the polyphosphates, drastic reaction conditions must be used. When such drastic reaction conditions are used, the resultant polyphosphates are of the long-chain variety, which Ueda teaches tend to become less crystalline as their chain length increases and are sparingly soluble. Ueda teaches that gels formed when he attempted to produce a concentrated solution from his products. A solution containing gels would not present an acceptable appearance as a high quality clear liquid fertilizer and the gels would tend to clog application equipment that is normally used to distribute clear liquid fertilizers on the field. Stinson (U.S. Pat. No. 3,540,874, assigned to the assignee of the present application) teaches that urea may be used as a condensing agent to form ammonium polyphosphate liquid fertilizers from impure wet-process phosphoric acid. Highly desirable products can be produced by the procedures described by Stinson, but the procedures are complicated and involve many steps. Furthermore, the final products obtained by Stinson's method contain all of the impurities originally present in the starting wet-process phosphoric acid and as a result have limited usefulness. Smith (U.S. Pat. No. 3,941,896) teaches the formation of modified ammonium polyphosphates by heating mixtures of urea and phosphoric acids but also includes as a necessary part of the process the incorporation of "a compound selected from sulfuric acid, boric acid, boric axide, phosphorus acid, sulphurous acid and the sodium, potassium, calcium, urea, and ammonium salts of said compounds." Our new and novel process for the production of urea-ammonium polyphosphate is less complicated than that described by Stinson and does not require the incorporation of an additive as taught by Smith.
[4] Ueda, Shiro, Oyama, Keiji, and Koma, Jenju Kogyo Kagaki Zasshi 66(5) 586–9
[5] Ueda, Shiro, Nakagawa, Tatsuro, and Koma, Kenji Kogyo Kagaku Zasshi 66(5) 589–92 (1963).

Poyer (U.S. Pat. No. 3,723,086) teaches that dissolution of small amounts of urea in wet-process acid prior to ammoniation of the acid in a confined reaction zone, such as a pipe reactor, reduces the amount of water-insoluble ammonium polyphosphates formed. Poynor, however, specifically limits the amount of urea utilized because of "problems in foaming and thickening of the resultant product" and is not concerned with the formation of polyphosphates by condensation of orthophosphates with the added urea. In fact, our studies have revealed that reaction of urea with phosphoric acid, with or without the presence of ammonia, in a confined space is not conductive to the condensation of orthophosphate with urea; instead the urea is hydrolyzed by contact with the water in the acid and very little polyphosphate is formed by the condensation reaction.

Rohlfs (U.S. Pat. No. 3,419,349) teaches that ammonium polyphosphate can be produced by heating urea phosphate but specifically excludes the possibility of utilizing urea phosphate alone as we teach. He specifies that also present must be "at least one member selected from the group consisting of (I) an ammonium-orthophosphate, II, a mixture thereof with an amount of phosphoric acid such that at most four phosphorus atoms are present for each ammonium equivalent."

In U.S. Pat. No. 3,713,802, issued to Ugine Kuhlmann, Gittenait utilizes urea phosphate as the starting material for producing liquid and solid urea-ammonium polyphosphate but specifies that the process "combines that chemical reactions between phosphoric acid, urea, and ammonia in such a manner that the overall thermal balance provides an excess, thus making it possible to operate under autothermal conditions" and the "preferred embodiment of the invention" results in "a reaction product" which contains 50–70 percent of the $P_2P_5$ as polyphosphate. Gittenait's equipment to produce this reaction product is unnecessarily complex; ammonia must be introduced in two locations and because of the "autothermal conditions" provided, specifically excludes the production of products of polyphosphate contents lower than 50 percent. To obtain products lower in $N:P_2O_5$ weight ratio than 0.5 which Gittenait states "for certain fertilizing treatments it is desirable," he must introduce additional wet-process phosphoric acid which, although not stated, has the disadvantage of reintroducing impurities which were removed in the crystallizing part of the process. In our new, novel, and improved process, utilizing less complex reaction equipment that is described in detail later, we are able to produce satisfactorily clear urea-ammonium polyphosphate liquids of low impurity content with $N:P_2O_5$ weight ratios as low as 0.38 without the need to add impure wet-process phosphoric acid with its inherent disadvantage of adding impurities. Another problem area recognized by Gittenait is that during "the manufacturing of a solid fertilizer, the product is vigorously kneaded before being introduced into a granulation plant so as to assist the crystallization of the polyphosphate and the obtaining of hard granules." Kneading is a power-consuming operation that is usually carried out in expensive and complicated machinery such as a Banberry Mixer or a double-shafted pugmill. Our process, as described infra, will overcome the disadvantages of Gittenait and still allow production of materials will excellent chemical and physical properties.

In German Pat. No. 2,308,408 issued to Badisch Aniline and Soda Factory, AG, Aug. 29, 1974, Theobald utilizes urea phosphate and the known condensing action of urea to form polyphosphates, but specifies that the process must be carried out in two stages where the crystals are melted in the first stage and then pyrolyzed into polyphosphates in the second stage. Theobald specifically excludes the possibility of carrying out the process in a single heating stage. Furthermore, he states that approximately 100 kcal/kg of urea phosphate is required in his heating step. Our process, as subsequently described herein, will allow simplification of the equipment which will overcome the disadvantage that the process must be carried out in two stages, and in addition, our process operates with significantly lower auxiliary heat input than that of Theobald.

A cursory search of the literature has failed to reveal any teachings relative to the adjustment of urea:biuret ratio to prevent biuret precipitation in polyphosphate-containing or in nonpolyphosphate-containing solutions.

It is an object of the present invention to produce stable fluid fertilizers of the clear solution type and solid mixed fertilizers containing upwards to about 45 percent total $(N+P_2O_5)$ in the fluid and to about 70 percent total $(N+P_2O_5)$ in the solids by a process employing urea as a condensing agent in urea phosphate and from which process liquid fertilizers produced form substantially no precipitate upon standing and storage.

A further object of the present invention is to produce stable fluid fertilizers of the clear solution type and solid mixed fertilizers containing upwards to about 45 percent total $(N+P_2O_5)$ in the fluid and to about 70 percent total $(N+P_2O_5)$ in the solids directly by pyrolyzing urea phosphate utilizing the condensing action of urea incorporated therein such that ammonium polyphosphate is formed, said process characterized by the fact that the resulting product has, in addition to relatively high contents of nitrogen and $P_2O_5$, and high $P_2O_5$ availability levels, and can have high or low proportions of the $P_2O_5$ as polyphosphate depending upon the pyrolysis conditions chosen.

A still further object of the present invention is to produce stable fluid fertilizers of the clear solution type and solid mixed fertilizers containing upwards to about 45 percent total $(N+P_2O_5)$ in the fluid and to about 70 percent total $(N+P_2O_5)$ in the solids directly by pyrolyzing urea phosphate utilizing the condensing action of urea incorporated therein such that ammonium polyphosphate is formed, said process characterized by the fact that biuret is prevented from precipitating from the fluid fertilizers or liquids made from the solids by ensuring that the ratio of urea to biuret is maintained above a certain value.

Still further and more general objects and advantages of the present invention will appear from the more detailed description set forth below, it being understood, however, that this more detailed description is given by way of illustration and explanation only and not necessarily by way of limitation since various changes therein may be made by those skilled in the art without departing from the true spirit and scope of the present invention.

Our invention, together with further objects and advantages thereof will be better understood from a consideration of the following description taken in connection with the accompanying drawings in which.

Figure 3:
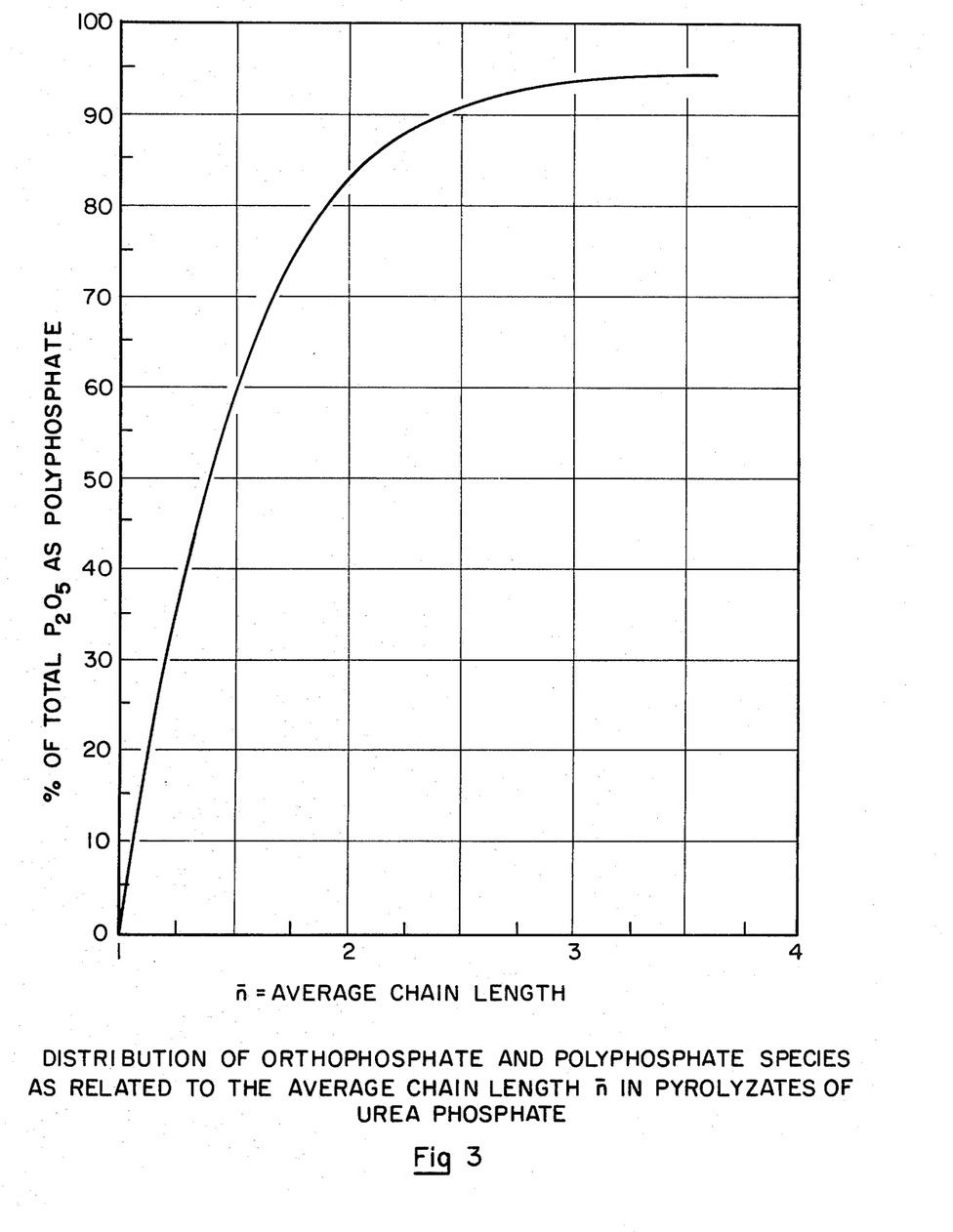
FIG. 3 is a graphical illustration depicting the relationship between the average chain-length $\bar{n}$ and the distribution of orthophosphate and polyphosphate species in pyrolyzates of urea phosphate.
Figure 5:
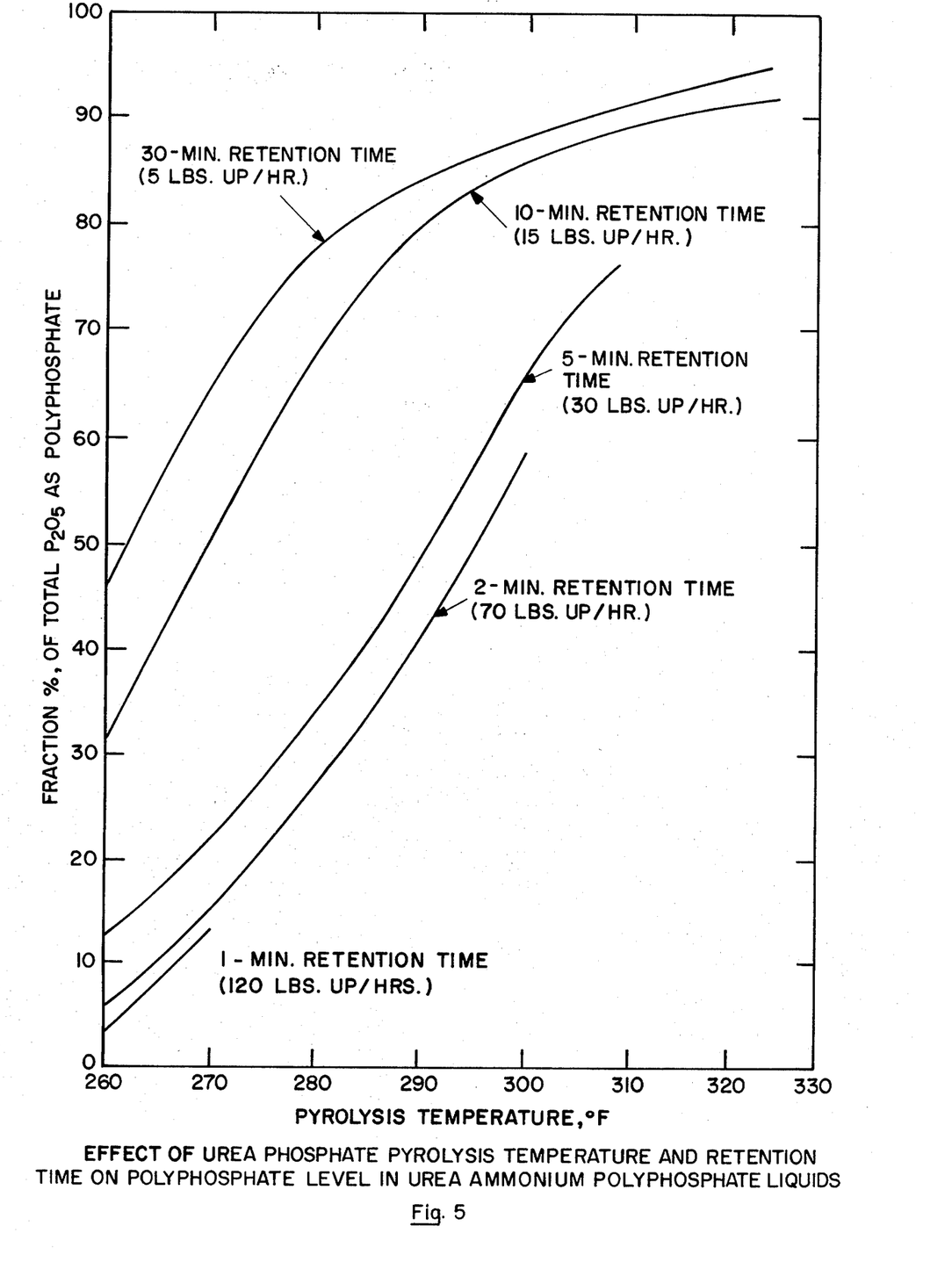
FIG. 5 is a graphical illustration of the various proportions of polyphosphate that can be formed at various retention times and temperatures in the pyrolysis reactor.

The process of the invention involves production of urea-ammonium polyphosphate by heating crystalline urea phosphate in one stage to ultimately produce either a solid or a liquid fertilizer. The general equation for the pyrolysis of urea phosphate can be written $$\bar{n}[CO(NH_2)_2 \cdot H_3PO_4] \rightarrow (NH_4)_{\bar{n}}H_2P_{\bar{n}}P_{3\bar{n}+1}\\ + CO(NH_2)_2 + (\bar{n}-1)CO_2 + (\bar{n}-2)NH_3$$

where $\bar{n}$ is the average chain length of the resulting ammonium polyphosphate. The distribution of orthophosphate and polyphosphate species as related to the average chain length $\bar{n}$ in pyrolyzates of urea phosphate, as is shown graphically in FIG. 3 and numerically in Table A, infra. The amount of polyphosphate that can be formed is controlled by the reaction conditions that are used as shown in FIG. 5.

Table A

Distribution of Orthophosphate and Polyphosphate Species as Related to the Average Chain Length $\bar{n}$ in Pyrolyzates of Urea Phosphate[1]

| Average chain length $\bar{n}$ | Percent of total $P_2O_5$ as indicated phosphates in pyrolyzates of urea phosphate | |
|---|---|---|
| | Orthophosphate | Polyphosphate |
| 1.0 | 100.0 | 0.0 |
| 1.05 | 91.7 | 8.3 |
| 1.1 | 83.5 | 16.5 |
| 1.2 | 69.4 | 30.6 |
| 1.3 | 57.8 | 42.2 |
| 1.33 | 55.0 | 45.0 |
| 1.4 | 48.1 | 51.9 |
| 1.5 | 40.0 | 60.0 |
| 1.6 | 33.4 | 66.6 |
| 1.7 | 27.9 | 72.1 |
| 1.8 | 23.4 | 76.6 |
| 1.9 | 19.7 | 80.3 |
| 2.0 | 16.8 | 83.2 |
| 2.1 | 14.4 | 85.6 |
| 2.2 | 12.4 | 87.6 |
| 2.3 | 10.9 | 89.1 |
| 2.37 | 10.0 | 90.0 |
| 2.4 | 9.7 | 90.3 |
| 2.5 | 8.7 | 91.3 |
| 2.6 | 7.9 | 92.1 |
| 2.7 | 7.3 | 92.7 |
| 2.8 | 6.8 | 93.2 |
| 2.9 | 6.4 | 93.6 |
| 3.0 | 6.0 | 94.0 |
| 3.1 | 5.8 | 94.2 |
| 3.2 | 5.5 | 94.5 |
| 3.3 | 5.3 | 94.7 |
| 3.4 | 5.1 | 94.9 |
| 3.5 | 5.0 | 95.0 |
| 3.6 | 5.0 | 95.0 |

[1]Data used to obtain these values was derived from an equation shown in table II; page 672, J. Agric. Food Chem., Vol. 26, No. 3, 1978 (TVA reprint X-399).

The process for production of urea-ammonium polyphosphate by pyrolysis of urea phosphate may be carried out on either a batch or continuous basis. The heat required initially to melt the urea phosphate and start the operation is usually supplied as steam to heating jackets surrounding the pyrolysis reactor. However, the heat may be supplied from other means such as preheating the urea phosphate and introduction of heated air directly into the pyrolysis reactor or to coils inside of or jackets surrounding the reactor. Alternatively, an acid may be added initially into the reactor and ammoniated or diluted with water to supply the heat initially required. Likewise, the heat required during operation may be supplied by means other than steam heating. These methods of providing the heat required are given by way of illustration and explanation only and not by way of limitation, since various changes therein may be made by those skilled in the art without departing from the true spirit and scope of the present invention.

In the condensation, a portion of the urea originally present in the urea phosphate adduct is broken down into carbon dioxide and ammonia. The carbon dioxide is evolved from the melt while the ammonia generally reacts to form the ammonium polyphosphates. Liberation of the carbon dioxide generates a considerable amount of foam which is controlled by vigorous agitation with a mechanical foam breaker. Under some conditions when high polyphosphate materials are being formed, the amount of ammonia released during pyrolysis is greater than the amount that can be combined as ammonium polyphosphate. Under this condition, the ammonia evolved is fed to the liquid fertilizer reactor and recovered there. This is not a disadvantage to the process; as in all cases where liquid products are being produced, some ammonia has to be added to the liquid fertilizer reactor in order to have solutions of the correct pH to ensure solution of the highest possible plant food content and to minimize corrosiveness of the liquid products.

Biuret is formed during pyrolysis also according to the following equation.

$$2(NH_2)_2CO \rightarrow NH(CONH_2)_2 + NH_3 \uparrow$$

Ammonia evolved in the biuret formation is also fixed in the formation of ammonium polyphosphate or recycled to the liquid fertilizer reactor as described above.

It is possible, as discussed in more detail infra, to incorporate other nutrients (primary nutrients, secondary nutrients, or micronutrients) in the pyrolyzate or to the finished liquid or solid products. When additional urea or ammonia is added, the general equation can be written:

$$(M)CO(NH_2)_2 + (A)NH_3 + H_3PO_4 \longrightarrow$$
$$\frac{1}{\bar{n}} H_{(\bar{n}+2)}P_{\bar{n}}O_{(3\bar{n}+1)} + (M - 1 + \frac{1}{\bar{n}})CO(NH_2)_2 +$$
$$(1 - \frac{1}{\bar{n}})CO_2 + (A + 2\frac{2}{\bar{n}})NH_3$$

M and A are the initial mole ratios urea: P and $NH_3$:P and $\bar{n}$ is the average chain length of the resulting polyphosphoric acid. A and M can have any value; however, in practice, values of M greater than 1 promote the formation of cyanuric acid and trimetaphosphate, especially when n becomes greater than about 4, equivalent to the presence of about 95 percent of the phosphorus as polyphosphates. The value of $\bar{n}$ may range from 1 to a maximum value that is by (1/1-M) when all of the urea is decomposed. Addition of some ammonia during pyrolysis may be very advantageous because of the exothermic nature of the reaction of ammonia and polyphosphoric acids to form ammonium polyphosphates. The extra heat so produced will reduce the amount of supplemental heat required for pyrolysis of the urea phosphate.

Figure 1:
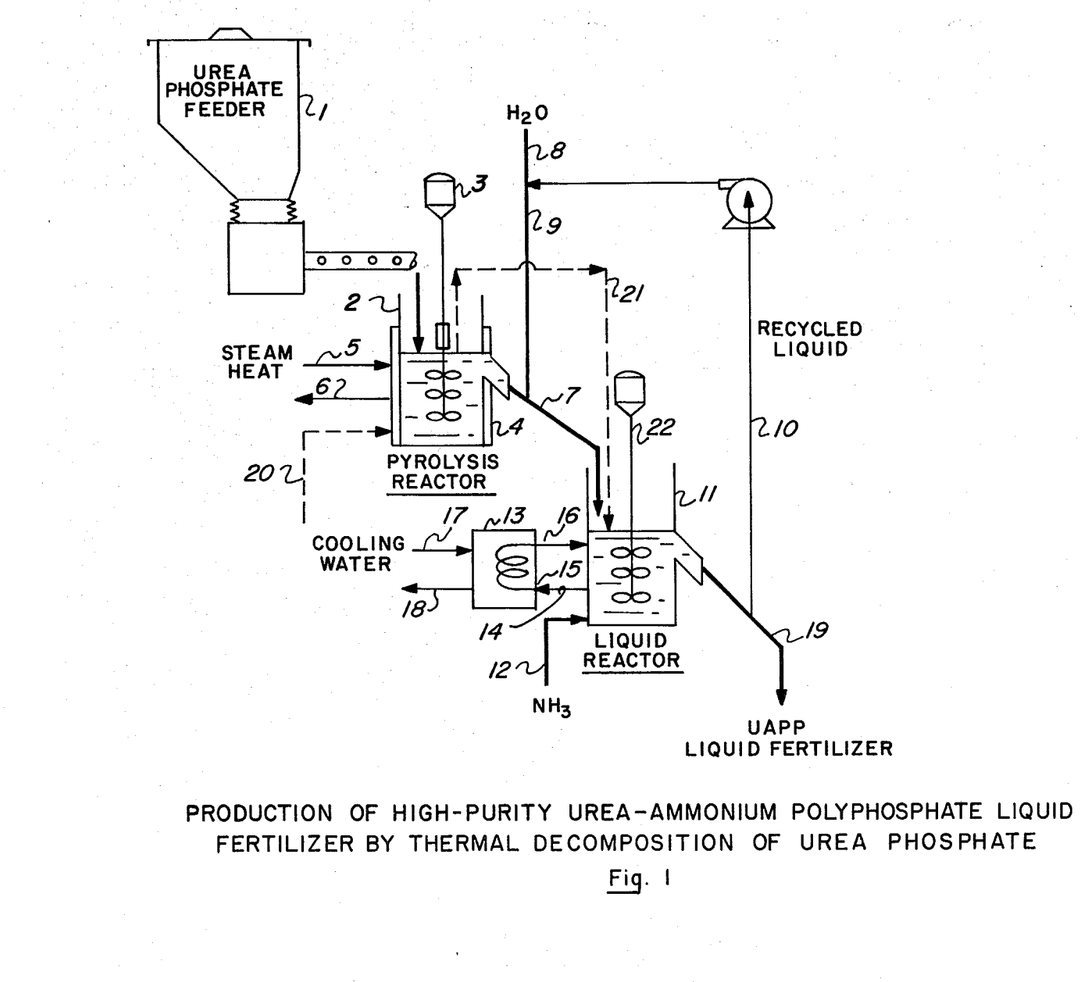
FIG. 1 is a flowsheet illustrating the principle utilized in carrying out our invention in the production of liquid fertilizers.
Figure 4:
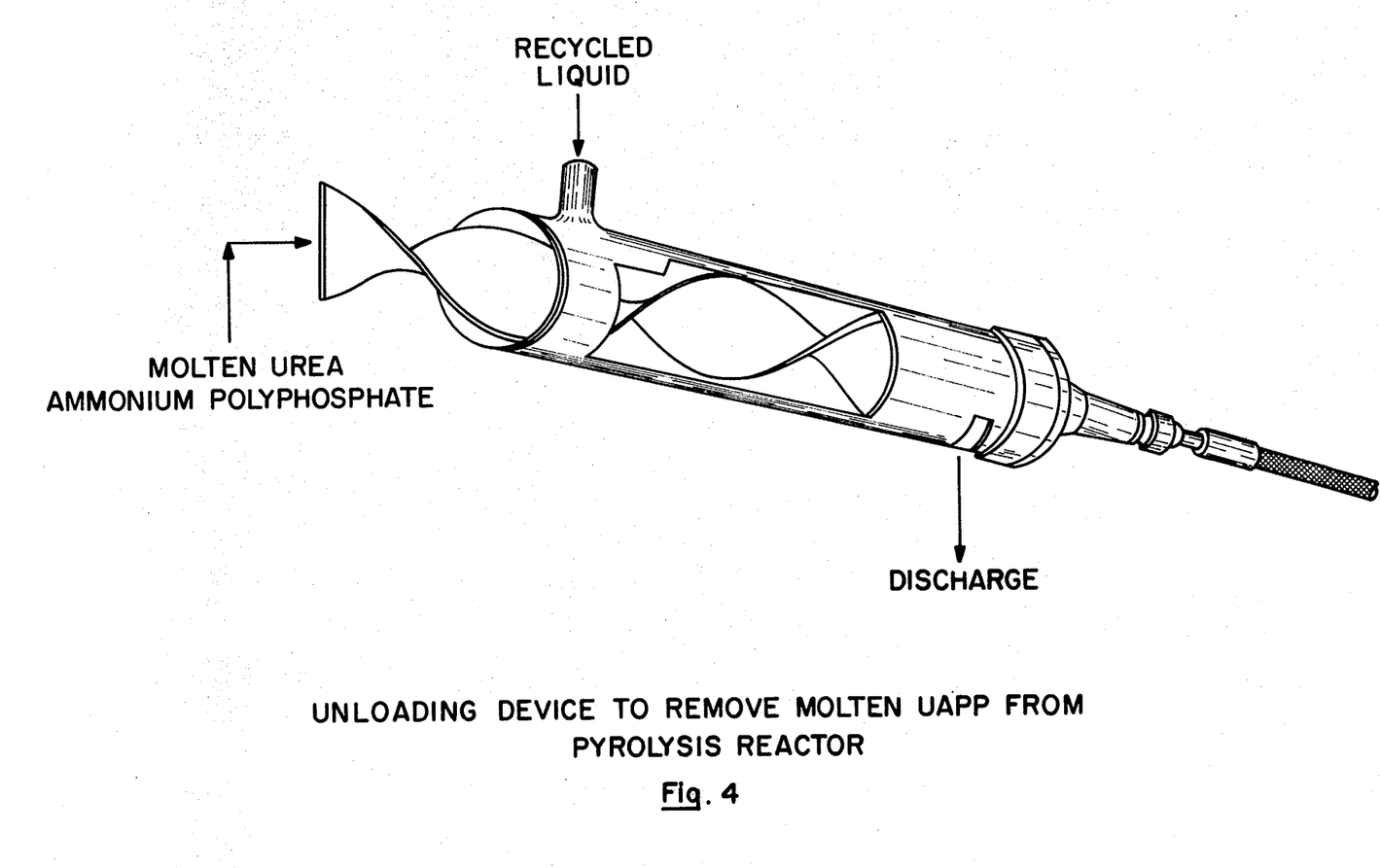
FIG. 4 is a drawing illustrating a device designed to withdraw molten urea phosphate from the pyrolysis reactor.

Referring now more specifically to FIG. 1 in which urea-ammonium polyphosphate liquids are produced, the crystalline urea phosphate obtained from a source not shown is fed into feeding and metering device 1 which controls the amount of urea phosphate fed into pyrolysis reactor vessel 2. This vessel 2 is equipped with a motor-driven agitation and foam breaking apparatus 3 running at such speed as to secure rapid and intimate mixing of the molten urea phosphate and combination of ammonia released during condensation with polyphosphoric acids formed to yield ammonium polyphosphates, and release of $CO_2$ that is also formed during the condensation reaction, to the atmosphere. The heat required for the pyrolysis reaction is provided by any suitable means which in this illustration is a steam jacket 4 wrapped around pyrolysis reactor 2. The amount of heat supplied to pyrolysis reactor 2 via steam jacket 4 will be controlled by feeding steam from a source not shown through means for control not shown via line 5 into jacket 4; the condensate from steam jacket 4 exits via line 6 to a suitable drain. Melt from pyrolysis reactor 2 discharges into line 7 and is mixed in line 7 with the water of formulation to make liquid fertilizers of the desired grade. The water from a source and metering means not shown enters through line 8 via line 9 along with recycled liquid fertilizer from line 10 all flowing into line 7 which contains the melt from pyrolysis reactor 2. It should be noted that in some instances, when the melt is high in polyphosphate and therefore extremely viscous, line 7 will consist of a specially designed and unique unloading device comprising an auger inside a tube, as illustrated in FIG. 4, to withdraw and transport the melt from pyrolysis reactor 2 into line 7. When the unloading device is used, the water of formulation and recycled liquid fertilizer will flow via line 9 into the feed end of the unloader and mixed therein with melt from pyrolysis reactor 2. The materials in line 7 discharge into liquid reactor vessel 11 which is equipped with motor-driven agitation apparatus 12 operated in such a manner as to secure rapid and intimate mixing of the constituents in this vessel. It should also be noted that for melts that contain up to about half of the phosphorus as polyphosphates, it is possible to direct the flow of melt via line 7 into liquid fertilizer reactor 11 without the use of the auger and without adding recycled liquid fertilizer and water to line 7; in this case, the water required in the liquid fertilizer formulation (line 8) would be added directly into liquid fertilizer reactor 11. Anhydrous ammonia from a source and metering means not shown is fed into reaction vessel 11 via line 12 to increase the pH of the liquid fertilizer to the desired value. The temperature of the contents in liquid reactor 11 is controlled by any suitable means. One method of cooling that can be used consists of circulating liquid fertilizer through cooler 13 at a rate controlled by variable speed pump 14 to maintain the desired liquid fertilizer temperature; the liquid to be cooled is pumped from liquid reactor vessel 11 via pump 14 through lines 15 into means for cooling 13 and then discharged back into liquid reactor 11 via line 16. Cooling water from a source and metering means not shown enters cooler 13 via line 17 and discharges via line 18 to a suitable sump, not shown. Product liquid fertilizer from the liquid reactor 11 flows via line 19 into a cooler, not shown, and then into any suitable means for storage. In some instances, it is desirable to add some or all of the anhydrous ammonia to the pyrolysis reactor and in this instance anhydrous ammonia from a source not shown would be metered through a metering system not shown into pyrolysis reactor 2 via dotted line 20. If an excess of ammonia is fed to pyrolysis reactor 2, the offgases from reactor 2 would be recycled to liquid reactor 11 via dotted line 21 to recover the excess ammonia.

Figure 2:
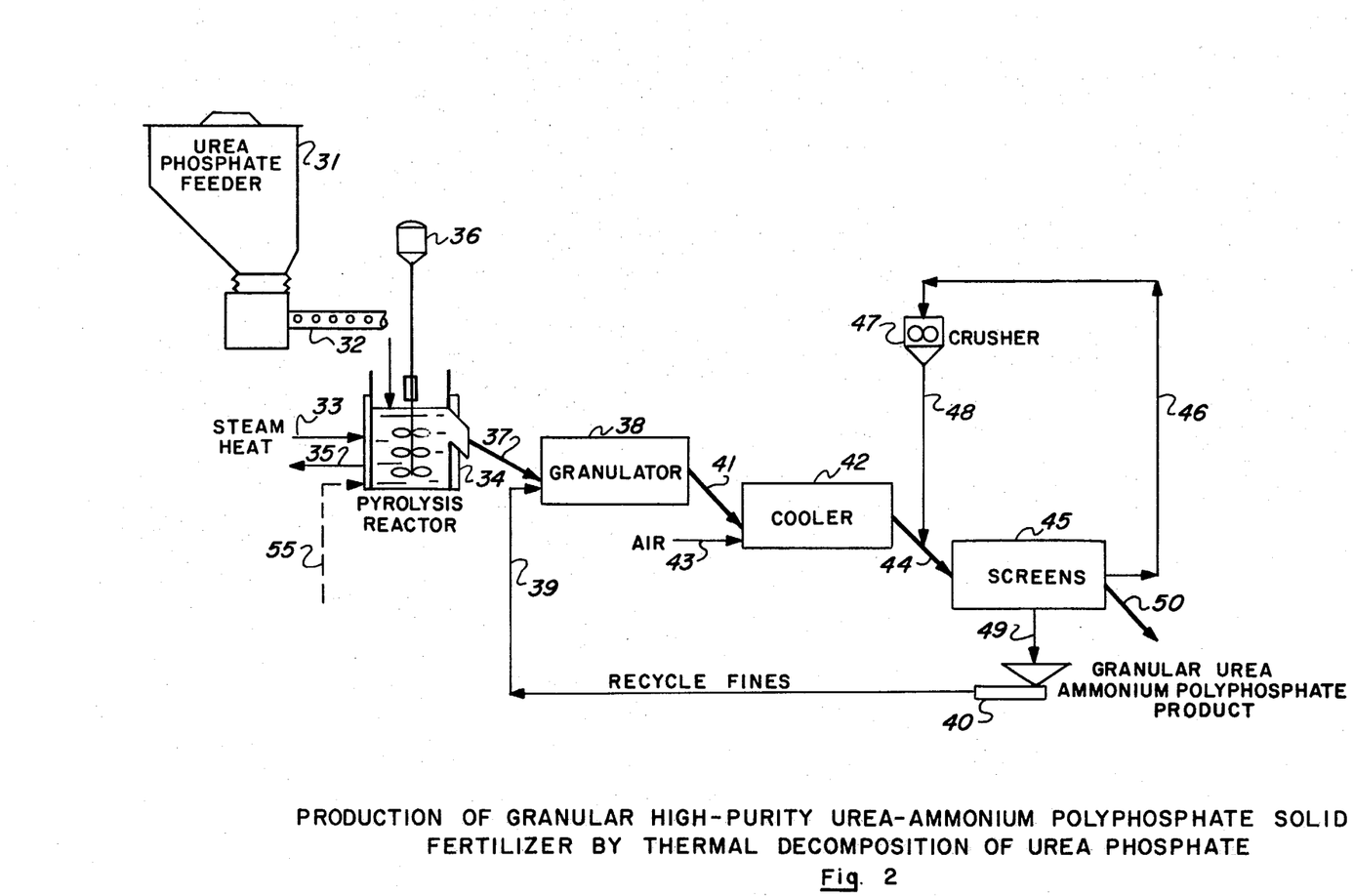
FIG. 2 is a flowsheet illustrating the principle utilized in carrying out our invention in the production of solid fertilizers.

Referring now more specifically to FIG. 2, crystalline urea phosphate from a source not shown is fed into feeding and metering device 31 and thence into pyrolysis reactor vessel 32. The crystals fed into pyrolysis reactor 32 are heated in reactor 32 to above their melting point by application of heat from any suitable means; one method of supplying heat into reactor 32 would be through a steam jacket wrapped around the reactor vessel. The steam heat from a source and metering means not shown enters via line 33 into jacket 34 and the condensate exits via line 35 to a suitable drain. The molten mass in pyrolysis reactor vessel 32 is stirred with motor-driven agitation and foam breaking system 36 running at such speed as to secure rapid and intimate mixing of the molten urea phosphate and combination of ammonia released during condensation with polyphosphoric acids to form ammonium polyphosphates and release of $CO_2$ that is also formed during the condensation reaction, to the atmosphere. The molten urea phosphate exits from pyrolysis reactor 32 via line 37 into granulator 38 where recycle fines also enter the granulator via line 39. If necessary, an auger inside a tube, as illustrated in FIG. 4, can be utilized to transport melt into the granulator. The flow of recycle fines to the granulator is regulated by means of control 40, which can be any suitable means, such as a surge bin or hopper-type arrangement mounted above an augering screw; however, any type of metering feeder that is suitable can be used. After granulation, the material discharges from granulator 38 via line 41 into cooler 42 where the material temperature is reduced to the desired value. One method of obtaining cooling is by supplying cooling air via line 43 from a source not shown and any suitable means for controlling the flow of cooling air, also not shown. The cooled granulator discharge then flows via line 44 to sizing screens 45. The oversize from the screens is fed via line 46 to crusher 47 where the material is reduced in size and then returned to the screens via line 48 and line 44 for further sizing. The undersize material from the screens is fed via line 49 to the recycle fines feeder-hopper 40; the temperature in the granulator also can be controlled by varying the fines feed rate into the granulator. The product size material flows from screens 45 via line 50 to a storage area not shown for final disposition. Alternatively, some ammonia may be added to the pyrolysis reactor from a source and means of control not shown through dotted line 55 into pyrolysis reactor 32.

Referring now more specifically to FIG. 3, this plot depicts the distribution of orthophosphates and polyphosphates between about 5 percent and about 95 percent polyphosphate that will be obtained in pyrolyzates of urea ammonium polyphosphates and, for simplicity, the amount of polyphosphate is expressed as average chain length $\bar{n}$ which, in this figure, ranges from values of 1.05 to 3.6. If desired, a further breakdown of the polyphosphate species at any given $\bar{n}$ value into pyro-, tri-, tetra-, penta-, hexa-, and octa- polyphosphate species can be determined by referring to FIG. 2, page 672 of J. Agric. Food Chem., Vol. 26, No. 3, 1978 (TVA reprint X-399). The distribution of phosphorus between the various polyphosphate species was determined by ascending paper chromatographic techniques and clearly resolved linear polyphosphates up through hepta- or octapolyphosphate. Thus, using information presented in FIG. 3 and FIG. 5, the proper reactor operating conditions can be selected to make pyrolyzates with essentially any desired polyphosphate content.

Referring again more specifically to FIG. 1, as well as FIG. 5, our experimental studies have shown that contrary to the teachings of both Gittenait, who specified ammonia must be added in two locations to the urea phosphate, and Theobald, who specified that the process must be carried out in two stages, we can produce urea-ammonium polyphosphate liquids of essentially any polyphosphate content without the addition of any ammonia and in one pyrolysis stage without first having to melt the urea phosphate crystals and wherein all of the auxiliary heat for the process was supplied by external heat. The experimental work outlining this can best be shown by examining FIG. 5, which is a plot obtained experimentally in our equipment of the various proportions of polyphosphate that can be formed at various retention times and temperatures. For simplicity, the various proportions of phosphate species can be defined an average chain length n̄, as shown in Table A, supra. A more detailed breakdown of the various phosphate species as related to average chain length n̄ is described in TVA reprint X-399, supra. For instance, operation of the pyrolysis reactor at a 1-minute retention time and furnishing sufficient steam to heat the pyrolysis reactor to 260° F. resulted in a melt which, when processed into a liquid, contained about 5 percent of the total phosphorus as polyphosphate. Alternatively, a liquid containing 95 percent of its total $P_2O_5$ was produced by the process illustrated in FIG. 1 by operating the pyrolysis reactor at a temperature of about 330° F. and at a retention time of about 30 minutes. Selected tests to illustrate the wide range of conditions that our process can be operated under and produce excellent products are shown in tables I and II, infra.

It should be noted that by virtue of carrying out the pyrolysis in one stage, we are able, as shown in tables I and II, infra, to produce liquids not under "autothermal conditions" and not which only contain from 50 to 70 percent polyphosphate, as specified by Gittenait, but which ranged in polyphosphate content from about 5 percent to upwards of 95 percent polyphosphate by varying the amount of heat input, not from an "autothermal" source but from a readily controlled heat source and by varying the retention time in the pyrolysis reactor to give a combination of time and temperature in the pyrolysis reactor, as specified in FIG. 5, to provide the amount of polyphosphate desired. When operating in this manner, our improved process is able to better conserve and utilize the heat available since our studies indicate that a decreasing amount of supplemental heat is required as the polyphosphate content was increased, as is shown in the tabulation below.

| Temperature, °C. (°F.) | Pyrolysis conditions Supplemental heat added, Kcal/kg urea phosphate at indicated retention time with % polyphosphate formed in parenthesis | | |
|---|---|---|---|
| | 15 min | 20 min | 30 min |
| 121 (250) | 69 (35) | — | — |
| 127–132 (260–265) | 42 (49–52) | — | — |
| 135 (275) | 34 (64) | — | — |
| 140 (285) | 31 (68) | — | — |
| 143 (290) | — | 58 (80) | — |
| 154 (310) | — | — | 57 (89) |

Thus, our new and improved process allows us to form under controlled conditions molten urea-ammonium polyphosphates that contain a wide range of polyphosphate contents by the addition of only small amounts of supplemental heat. For example, we are able to form urea-ammonium polyphosphates that contain from 50 to 70 percent of the phosphorus as polyphosphates by the expenditure of only 42 to 31 Kcal/kg of urea phosphates, whereas Theobald specifies that by his process, which is more complicated and involved, an expenditure of 100 Kcal/kg of urea phosphate is necessary to produce urea-ammonium polyphosphates of this polyphosphate range. Furthermore, our heat requirements included heat losses which would be even less in large-scale operation. In our studies, the heat required to produce materials that contain 50 percent or more of the phosphorus as polyphosphates is equal to the heat loss. As can be seen by the data tabulated below in tables I, II, III, and IV, by our new and novel process we are able to produce materials of a wider range of polyphosphate contents than envisioned by either Theobald or Gittenait, and at a much lower heat requirement than contemplated by Theobald.

Table I

| Urea-Ammonium Polyphosphate from Crystalline Urea Phosphate,[a] Followed by Production of Liquids Directly from the Hot Melt | | | | | | | | |
|---|---|---|---|---|---|---|---|---|
| Test No., UAP- | 4/21A | 6/20 | 4/14B | 4/13C | 5/25 | 6/13A | 6/13B | 6/14 |
| Urea phosphate crystals fed,CUP- | 48PP | 48PP | 46PP | 46PP | 46PP | 42 | 42 | 47PP |
| Pyrolysis reactor (single stage)[b] | | | | | | | | |
| Urea phosphate feed rate, lb/hr | 127 | 127 | 66 | 66 | 66 | 29 | 29 | 29 |
| Reactor conditions | | | | | | | | |
| Temperature, °F. | 260 | 270 | 260 | 280 | 298 | 260 | 280 | 310 |
| Retention time, min | 1 | 1 | 2 | 2 | 2 | 5 | 5 | 5 |
| Liquid fertilizer reactor[c] | | | | | | | | |
| Reactor conditions | | | | | | | | |
| Temperature, °F. | 80–100 | 80–100 | 80–100 | 80–100 | 80–100 | 80–100 | 80–100 | 80–100 |
| Retention time, min | 1 | 1 | 2 | 2 | 2 | 4 | 4 | 4 |
| Discharge composition | | | | | | | | |
| Grade | 12.1–18.5–0 | 13.4–20.7–0 | 13.7–21.2–0 | 15.0–22.8–0 | 14.8–27.0–0 | 14.8–23.3–0 | 15.9–26.9–0 | 13.7–29.2–0 |
| % of total $P_2O_5$ as polyphosphate | 4 | 14 | 8 | 23 | 58 | 12 | 30 | 76 |
| Biuret, % by wt. | Nil | 0.1 | Nil | 0.2 | 0.8 | 0.1 | 0.3 | 0.9 |
| $NH_3$-N, % by wt. | 5.0 | 5.9 | 5.5 | 6.2 | 7.9 | 6.4 | 7.3 | 8.0 |
| MgO, % by wt. | <0.01 | 0.01 | 0.01 | 0.01 | 0.01 | 0.05 | 0.05 | 0.01 |
| F, % by wt. | <0.01 | 0.01 | 0.01 | 0.01 | 0.02 | 0.08 | 0.09 | 0.02 |
| Lb $NH_3$/unit $P_2O_5$ | 6.6 | 6.9 | 6.3 | 6.6 | 7.1 | 6.7 | 6.6 | 6.7 |
| Lb urea/100 lb $P_2O_5$ | 83 | 78 | 83 | 82 | 52 | 77 | 68 | 39 |
| Lb urea/lb biuret | — | 161 | — | 94 | 18 | 180 | 61 | 13 |
| pH (undiluted) | 6.0 | 6.2 | 6.1 | 6.1 | 6.2 | 6.1 | 6.2 | 6.2 |
| Density, g/ml, at 80° F. | 1.221 | 1.261 | 1.269 | 1.292 | 1.324 | 1.300 | 1.329 | 1.338 |

[a]Composition of urea phosphate shown in Table III.
[b]The pyrolysis reactor was a 5-inch-diameter tank-type vessel 12 inches high with an overflow located 5 inches above the bottom of the vessel; it was fabricated from 316 stainless steel. Agitation was supplied by three flat-bladed turbine agitators (2½ in dia. by 15/16 in high); they were rotated at about 1750 rpm.
[c]The liquid fertilizer reactor,is a 5-inch-diameter tank-type stainless steel vessel 12 inches high with an overflow located 4 inches above the bottom of the vessel; agitation was supplied with three 3-bladed impellers. The pyrolyzate was mixed with 5 pounds recycled liquid fertilizer which then flowed into the liquid reactor.

Table II

Urea-Ammonium Polyphosphate from Crystalline Urea Phosphate,[a] Followed by Production of Liquids Directly from the Hot Melt

| Test No., UAP- | 10/6 | 7/11C | 7/11D | 6/15A | 6/15B | 4/26B | 11/4 | 12/7A |
|---|---|---|---|---|---|---|---|---|
| Urea phosphate crystals fed, CUP- | 24 | 48PP | 48PP | 48PP | 48PP | 48PP | 33 | 25 |
| Pyrolysis reactor (single stage)[b] | | | | | | | | |
| Urea phosphate feed rate, lb/hr | 14.5 | 14.5 | 14.5 | 4.8 | 4.8 | 4.8 | 29.1 | 14.5 |
| Lb NH$_3$/unit P$_2$O$_5$ fed | 0 | 0 | 0 | 0 | 0 | 0 | 2 | 3.3 |
| Reactor conditions | | | | | | | | |
| Temperature, °F. | 260 | 290 | 320 | 260 | 280 | 330 | 300 | 280 |
| Retention time, min | 10 | 10 | 10 | 30 | 30 | 30 | 5 | 10 |
| Liquid fertilizer reactor[c] | | | | | | | | |
| Reactor conditions | | | | | | | | |
| Temperature, °F. | 80–100 | 80–100 | 80–100 | 80–100 | 80–100 | 80–100 | 80–100 | 80–100 |
| Retention time, min | 7 | 7 | 7 | 21 | 21 | 21 | 4 | 7 |
| Discharge composition | | | | | | | | |
| Grade | 15.8–26.7–0 | 14.8–29.5–0 | 13.2–29.7–0 | 16.3–28.8–0 | 13.8–29.6–0 | 12.4–32.2–0 | 13.3–28.9–0 | 17.5–33.8–0 |
| % of total P$_2$O$_5$ as polyphosphate | 31 | 77 | 86 | 44 | 75 | 95 | 80 | 69 |
| Biuret, % by wt. | 0.4 | 0.9 | 0.8 | 0.8 | 0.8 | 1.0 | 0.5 | 0.3 |
| NH$_3$-N, % by wt. | 7.4 | 8.4 | 8.3 | 8.1 | 8.2 | 8.9 | 8.0 | 9.7 |
| MgO, % by wt. | 0.05 | 0.02 | 0.02 | 0.02 | 0.02 | 0.02 | 0.01 | 0.05 |
| F, % by wt. | 0.09 | 0.02 | 0.02 | 0.03 | 0.03 | 0.03 | <0.01 | 0.07 |
| Lb NH$_3$/unit P$_2$O$_5$ | 6.6 | 6.9 | 6.8 | 6.8 | 6.7 | 6.7 | 6.7 | 7.0 |
| Lb urea/100 lb P$_2$O$_5$ | 68 | 44 | 33 | 59 | 39 | 21 | 38 | 49 |
| Lb urea/lb biuret | 166 | 14 | 12 | 21 | 14 | 7 | 22 | 55 |
| pH (undiluted) | 6.2 | 6.2 | 6.2 | 6.2 | 6.1 | 6.2 | 6.0 | 6.2 |
| Density, g/ml, at 80° F. | 1.3 | 1.348 | 1.330 | 1.350 | 1.340 | 1.350 | 1.332 | 1.407 |

[a]Composition of urea phosphate shown in Table III.
[b]The pyrolysis reactor was a 5-inch-diameter tank-type vessel 12 inches high with an overflow located 5 inches above the bottom of the vessel; it was fabricated from 316 stainless steel. Agitation was supplied by three flat-bladed turbine agitators (2¼ in dia. by 15/16 in high); they were rotated at about 1750 rpm.
[c]The liquid fertilizer reactor, was a 5-inch-diameter tank-type stainless steel vessel 12 inches high with an overflow located 4 inches above the bottom of the vessel; agitation was supplied with three 3-bladed impellers. The pyrolyzate was mixed with 5 pounds recycled liquid fertilizer which then flowed into the liquid reactor.

Table III

Composition of Crystalline Urea Phosphates[a] (UP) Used in Pyrolysis Tests

| Test No., CUP- | Acid source[b,c] | Total N | Total P$_2$O$_5$ | Fe$_2$O$_3$ | Al$_2$O$_3$ | SO$_-$ | F | MgO | Biuret | H$_2$O | Average crystal size micron | Av. reduction in impurity level (Al,Fe,Mg,F) % | Lb Urea/ 100 lb P$_2$O$_5$ | Lb MgO 100 lb P$_2$O$_5$ |
|---|---|---|---|---|---|---|---|---|---|---|---|---|---|---|
| \multicolumn{15}{l}{Urea Phosphate Crystals Separated from Mother Liquor by Batch Centrifugation (900 G for 60 sec)} |
| 35 | Florida 3 | 17.4 | 44.3 | 0.30 | 0.22 | 0.2 | 0.11 | 0.07 | Nil | 0.3 | 580 | 82 | 84 | 0.16 |
| 24 | Florida 1 | 17.4 | 44.3 | 0.16 | 0.13 | 0.3 | 0.12 | 0.06 | Nil | 0.4 | 575 | 86 | 84 | 0.14 |
| 25 | Florida 1 | 17.4 | 44.2 | 0.15 | 0.15 | 0.3 | 0.10 | 0.05 | 0.07 | 0.3 | 610 | 88 | 84 | 0.11 |
| 33 | North Carolina[d] | 17.6 | 44.7 | 0.05 | 0.03 | <0.1 | 0.02 | 0.03 | Nil | 0.1 | 460 | 95 | 84 | 0.07 |
| \multicolumn{15}{l}{Urea Phosphate Crystals Separated from Mother Liquor by Continuous Centrifugation (600 G)} |
| 42 | Florida 1 | 17.4 | 44.5 | 0.16 | 0.16 | 0.2 | 0.15 | 0.08 | Nil | 0.3 | 540 | 84 | 84 | 0.18 |
| 46PP | Florida 4 | 17.7 | 44.6 | 0.05 | 0.05 | <0.1 | 0.02 | 0.01 | Nil | 0.1 | 600 | 96 | 85 | 0.02 |
| 47PP | Florida 4 | 17.5 | 44.7 | 0.05 | 0.05 | <0.1 | 0.02 | 0.02 | Nil | 0.1 | 520 | 96 | 84 | 0.05 |
| 48PP | Florida 4 | 17.6 | 44.5 | 0.05 | 0.06 | 0.01 | 0.03 | 0.03 | Nil | 0.2 | 470 | 95 | 85 | 0.07 |

[a]Produced batchwise from unconditioned urea and wet-process merchant-grade phosphoric acid.
[b]Composition of wet-process acids is as follows:

| Source | Total P$_2$O$_5$ | Fe$_2$O$_3$ | Al$_2$O$_3$ | SO$_4$ | F | MgO | W.T. solids |
|---|---|---|---|---|---|---|---|
| | \multicolumn{7}{c}{% by wt.} |
| Florida 1 | 52.8 | 1.2 | 1.7 | 3.5 | 0.9 | 0.58 | 1.2 |
| Florida 3 | 54.0 | 1.65 | 1.25 | 3.1 | 0.82 | 0.48 | 0.6 |
| Florida 4 | 53.1 | 1.3 | 1.1 | — | 0.9 | 0.67 | — |
| North Carolina | 53.8 | 1.4 | 0.6 | 3.5 | 0.3 | 1.00 | — |

[c]Produced from uncalcined phosphate rock except as noted.
[d]Produced from calcined phosphate rock

Table IV

Effect of Urea Addition on Biuret Solubility in Urea-Ammonium Polyphosphate Liquids

| Test No. UAP- | % of P$_2$O$_5$ as polyphosphate | N | P$_2$O$_5$ | Urea | Biuret | Total plant food % | N:P$_2$O$_5$ wt. ratio | Lb urea/ lb biuret | Weeks liquid stored at 32° F. | Precipitating phase |
|---|---|---|---|---|---|---|---|---|---|---|
| | | \multicolumn{4}{c}{% by wt.} | | | | | |
| 11/24A | 64 | 14.9 | 28.1 | 14 | 0.93 | 43 | 0.530 | 15 | 1 | Biuret |
| 11/3B[a] | 70 | 15.9 | 29.1 | 16 | 1.0 | 45 | 0.546 | 16 | >24 | None |
| 11/24B[a] | 69 | 15.1 | 27.9 | 15 | 0.79 | 43 | 0.541 | 19 | >30 | None |

Table IV-continued

Effect of Urea Addition on Biuret Solubility in Urea-Ammonium Polyphosphate Liquids

| Test No. UAP- | % of $P_2O_5$ as polyphosphate | Composition of liquid | | | | Total plant food % | $N:P_2O_5$ wt. ratio | Lb urea/ lb biuret | Weeks liquid stored at 32° F. | Precipitating phase |
|---|---|---|---|---|---|---|---|---|---|---|
| | | % by wt. | | | | | | | | |
| | | N | $P_2O_5$ | Urea | Biuret | | | | | |
| 12/3A | 80 | 14.2 | 30.8 | 11 | 0.79 | 45 | 0.461 | 14 | 4 | Biuret |
| 12/3B[a] | 79 | 15.4 | 29.6 | 15 | 0.32 | 45 | 0.520 | 46 | >26 | None |

[a]Additional urea added to liquid reactor.

As may be seen, several tests are included in Table II supra to illustrate that, if desired, anhydrous ammonia can be added to the pyrolysis reactor to replace some of the ammonia added in the liquid fertilizer reactor. The addition of ammonia to the pyrolysis reactor is not necessary to make the process work but if practiced will reduce the amount of supplemental heat required. Examples of the reduction in biuret by addition of anhydrous ammonia are shown in Table II, supra.

When the amount of biuret formed in the urea-ammonium polyphosphate liquids produced by the process illustrated in FIG. 1 exceeds the solubility of the biuret in the liquid fertilizer, biuret will precipitate. We have found that in these urea-ammonium polyphosphate liquids that, if the liquids contain 16 or more pounds urea per pound biuret, no biuret will percipitate even when the liquids are cooled to 32° F. Thus, as shown in Table IV supra, our experiments have shown that when biuret is liable to precipitate, the addition of urea in either the liquid fertilizer reactor or to the liquid storage vessel, to increase the level of urea to at least 16 pounds urea per pound biuret will either prevent the biuret from precipitating or solubilize the biuret if it does precipitate. This discovery is new and novel and, to our knowledge, has not been recognized by prior investigation.

In the process described in FIG. 1, the water of formulation to make the liquid fertilizer along with recycle liquid from the liquid fertilizer reactor were fed to line 7. This was done to quench the hot melt and also to increase its fluidity. In general, urea-ammonium polyphosphate melts containing up to about 50 percent of the $P_2O_5$ as polyphosphate were free flowing enough so that when mixed with the recycle liquid fertilizer and water of formulation, they would flow down line 7 into the liquid reactor 11 (FIG. 1). However, if the melts contain more than about 50 percent of the $P_2O_5$ as polyphosphate or if ammonia is added in the pyrolysis reactor, the viscosity of the melt becomes so high that it will not flow easily by gravity to the liquid reactor. When the melt will not flow from the pyrolysis reactor, it can only eventually flow over the top of the pyrolysis reactor causing the process to be shut down. We have overcome this difficulty, which was not recognized by either Gittenait or Theobald, by devising an unloading device, which is shown in FIG. 5, and which can be installed and used in line 7, FIG. 1, or line 37, FIG. 2, either at all times or when it is anticipated that the melt viscosity will become high and cause problems. This is a new and novel addition to the process which allows operation at essentially any reaction condition.

It should be noted that if three-component liquids or liquids containing more nitrogen than is usually in the molten urea-ammonium polyphosphate discharged from the pyrolysis reactor, then supplementary materials or secondary or micronutrient-containing materials, such as potash, or urea, or materials containing secondary nutrients or micronutrients may be added either to the pyrolysis reactor or the liquid fertilizer reactor.

After sifting and winnowing through the data, results, and operations of our novel, improved, and unique method for produced urea-ammonium polyphosphate liquids, we now present in Table V acceptable and preferred ranges for operation of the process described in FIG. 1.

Table V

Acceptable and Preferred Ranges for Production of Urea-Ammonium Polyphosphate Liquid Fertilizers

| Variables | Limits | Preferred |
|---|---|---|
| Pyrolysis reactor | | |
| Temperature, °F. | 260–350 | 260–350 |
| Retention time, min | 1–30 | 2–20 |
| Input lb anhydrous $NH_3$/ unit $P_2O_5$ | 0–3.8 | 0–3.8 |
| % of total $P_2O_5$ as polyphosphate | about 8–95 | about 8–90 |
| Liquid reactor | | |
| Temperature, °F. | 50–150 | 75–125 |
| Retention time, min | 5–30 | 5–15 |
| Anhydrous ammonia added to give discharge pH | 5.5–7.0 | 5.7–6.8 |
| Water added to give a density at 80° F. | 1.20–1.40 | 1.25–1.36 |

It has also been found that liquids such as a 14-22-0 grade, for example, which will remain free of precipitate for short times can be made by adding sufficient solid or liquid polyphosphate-containing materials such as 10-34-0, 11-37-0, superphosphoric acid, unrea-ammonium polyphosphate, or solid ammonium polyphosphates to the crystalline urea phosphate to provide sufficient polyphosphate to sequester the small amount of impurities remaining in the urea phosphate.

Referring now more specifically to FIG. 2, our experimental studies have shown that a solid granular urea-ammonium polyphosphate product can be produced utilizing the pyrolysis section of FIG. 1 but replacing the liquid fertilizer reaction section with the granulator, cooler, screens, and crusher as shown in FIG. 2. To expedite our studies, we operated the pyrolysis reactor and granulator on a continuous basis but carried out the cooling, crushing, and screening steps on a batch basis. In operation of the pyrolysis reactor shown in FIG. 2, the same general conditions and procedures used in production of melts for liquid production as illustrated in FIG. 1 would apply, i.e., anhydrous ammonia can be added if desired and the unloader shown in FIG. 4 would be used when desired to help move the molten urea-ammonium polyphosphate from the pyrolysis reactor to the granulator. Examples of our experimental studies are shown in Table VI and indicate that solids with grades ranging from 17-45-0 to 21-46-0 and containing up to about 50 percent of the $P_2O_5$ as polyphosphate can be made simply by varying reaction conditions in the pyrolysis reactor. These solids are suitable for direct application or can be dissolved in aqua ammonia and processed into a liquid fertilizer. Alternatively, if other grades of fertilizer, such as 29-29-0, 39-13-0, 19-19-19, or 15-30-15 or ones containing secondary or micronutrient values are desired, supplementary material such as urea, potash, or secondary or micronutrientcontaining solids can be added to either the pyrolysis reactor or the granulator to give the requested formulation. The above grades and formulations are for example and illustration only and are not meant to limit the formulations that can actually be produced. A pan granulator can be used to produce acceptable granules. This type granulator does not have any kneading action, as was specified as a requirement in Gittenait's patent "to assist the crystallization of the polyphosphate and the obtaining of hard granules," and our process is an improvement since we can obtain the hard granules without extensive working of the melt during granulation. In addition, a pug mill can be used, as shown in Table VI, to produce products that were in good physical condition after standing overnight.

Table VI

| Test No. UAP- | Granulation of Pyrolyzed Urea Phosphate[a] in a Pug Mill | | | |
|---|---|---|---|---|
| | 3/23/77-A | 3/23/77-B | 3/28/77-A | 3/28/77-B |
| Urea phosphate crystals fed, CUP- | 35 | 35 | 35 | 35 |
| Pyrolysis reactor (single stage)[b] | | | | |
| Urea phosphate feed rate, lb/hr | 14.5 | 14.5 | 14.5 | 14.5 |
| Ammonia added, lb/unit $P_2O_5$ | 0 | 2 | 0 | 0 |
| Reactor conditions | | | | |
| Temperature, °F. | 262 | 265 | 260 | 255 |
| Urea-ammonium polyphosphate melt | | | | |
| Chemical analysis, % | | | | |
| Total N | 18.3 | 19.5 | 18.0 | 18.0 |
| Total $P_2O_5$ | 46.6 | 46.5 | 45.4 | 45.6 |
| $NH_3$—N | 3.1 | — | — | — |
| Polyphosphate, % of total $P_2O_5$ | 31 | 36 | 21 | 22 |
| Lb $NH_3$/unit $P_2O_5$ | 1.6 | — | — | — |
| pH (10% solution) | 2.1 | 3.3 | 2.1 | 2.0 |
| Granulation with pug mill[c] | | | | |
| Pug mill product | | | | |
| Temperature, °F. | 115 | 120 | 100 | 100 |
| Chemical analysis | | | | |
| Total N | 19.9 | 21.8 | 20.2 | 20.7 |
| Total $P_2O_5$ | 46.6 | 45.7 | 46.3 | 46.9 |
| Polyphosphate, % of total $P_2O_5$ | 49 | 45 | 45 | 43 |

[a] See CUP-35 in Table II for composition of urea phosphate used in these tests.
[b] Urea phosphate (CUP-35) was fed at a rate of 14.5 pounds per hour to pyrolysis reactor No. 4 (Table I) which was operated at a 10-minute retention time using a stirrer speed of 1750 rpm.
[c] The melt was mixed with 5 pounds of recycle per pound of melt; the recycle, 22-46-0 grade containing 53 percent polyphosphate, was synthetically produced by mixing 33 pounds of urea per 100 pounds of 15-62-0 grade ammonium polyphosphate.

After sifting and winnowing through data, results, and operations of our novel and unique method for producing urea-ammonium polyphosphate solids, we now present in Table VII below acceptable and preferred ranges for operation of the process described in FIG. 2.

Table VII

| Acceptable and Preferred Ranges for Production of Urea-Ammonium Polyphosphate Solid Fertilizers | | |
|---|---|---|
| Variables | Limits | Preferred |
| Pyrolysis reactor | | |
| Temperature, °F. | 260–350 | 260–350 |
| Retention time, min. | 1–30 | 2–20 |
| Input lb anhydrous $NH_3$/unit $P_2O_5$ | 0–3.8 | 0–3.8 |
| % of total $P_2O_5$ as polyphosphate | about 8–50 | about 8–45 |
| Granulation facilities | | |
| Granulator | | |
| Temperature, °F. | 75–175 | 100–150 |

Table VII-continued

| Acceptable and Preferred Ranges for Production of Urea-Ammonium Polyphosphate Solid Fertilizers | | |
|---|---|---|
| Variables | Limits | Preferred |
| Retention time, min | 1–30 | 2–10 |
| Recycle rate, lb recycle/lb pyrolyzate | 1–10 | 2–7 |
| Cooler | | |
| Temperature at discharge, °F. | 60–100 | 70–90 |
| Retention time, min | 1–30 | 5–20 |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by letters patent of the United States is:

1. A process for the production of high-purity urea-ammonium polyphosphate liquids, which process consists of the steps of:
   (1) heating at about atmospheric pressure solid urea orthophosphate to a temperature in the range from about 260° F. to about 350° F., thereby converting said solid urea orthophosphate to the melt phase;
   (2) continuously agitating by mechanical means the resulting melt, said agitation being sufficient to ensure control of foam produced in said melt and caused by evolution of carbon dioxide therein, said agitation effecting release of said carbon dioxide from said foam to the atmosphere;
   (3) maintaining the resulting melt of urea phosphate at said temperature for a period of about 1 to about 30 minutes to simultaneously effect the pyrolysis of from about 0.05 moles urea per mole $H_3PO_4$ to about 0.578 moles urea per mole $H_3PO_4$ of the urea component of said orthophosphate and to condense from about 8 to about 90 percent of the orthophosphate component of said urea orthophosphate to directly produce urea-ammonium polyphosphate melts, said melts being mixtures of urea and ammonium polyphosphate, said ammonium polyphosphate being of the general formula $(NH_4)_{\bar{n}}H_2P_{\bar{n}}O_{3\bar{n}+1}$, where $\bar{n}$ is the average chain length of the ammonium polyphosphate and ranges from greater than about 1.05 to less than about 3; and (4) subsequently dissolving the resulting pyrolyzed urea ammonium polyphosphate melt in relatively weak aqua ammonia to produce said highpurity urea ammonium polyphosphate liquid, the concentration of said ammonia in said relatively weak aqua ammonia being sufficient to adjust the final pH of said polyphosphate liquid to a near neutral value to maximize the solubility of the polyphosphate in aqueous solution and minimize the deleterious corrosive characteristics thereof.

2. A process of the production of high-purity solid urea-ammonium polyphosphate, which process consists of the steps of:
(1) heating at about atmospheric pressure solid urea orthophosphate to a temperature in the range from about 260° F. to about 350° F., thereby converting said solid urea orthophosphate to the melt phase;
(2) continuously agitating by mechanical means the resulting melt, said agitation being sufficient to ensure control of foam produced in said melt and caused by evolution of carbon dioxide therein, said agitation effecting release of said carbon dioxide from said foam to the atmosphere;
(3) maintaining the resulting melt of urea phosphate at said temperature for a period of about 1 to about 30 minutes to simultaneously effect the pyrolysis of from about 0.05 moles urea per mole $H_3PO_4$ to about 0.248 moles urea per mole $H_3PO_4$ of the urea component of said urea orthophosphate and to condense from about 8 to about 45 percent of the orthophosphate component of said urea orthophosphate with the resulting pyrolyzed urea component of said urea orthophosphate to directly produce urea-ammonium polyphosphate melts, said melts being mixtures of urea and ammonium polyphosphate, said ammonium polyphosphate being of the general formula $(NH_4)_{\bar{n}}H_2P_{\bar{n}}O_{3\bar{n}+1}$, where $\bar{n}$ is the average chain length of the ammonium polyphosphate and ranges from greater than about 1.05 to less than about 1.4;

(4) subsequently removing the resulting pyrolyzed urea-ammonium polyphosphate melt and introducing same, together with recycled fines of predetermined size from a later-mentioned sizing step into granulating means; and (5) subsequently removing the resulting granulated urea-ammonium polyphosphate from said granulating means and introducing said granulated urea-ammonium polyphosphate into cooling means wherein the granulated material is cooled to about ambient temperature and subsequently introduced into said sizing means wherefrom is recovered solid ureaammonium polyphosphate product.

3. The process of claim 1 wherein sufficient supplemental urea is added to the urea-ammonium polyphosphate liquid to effect a minimum ratio of 16 pounds urea per pound of biuret in the resulting urea ammonium polyphosphate liquid, thereby preventing post precipitation of biuret.

* * * * *

UNITED STATES PATENT AND TRADEMARK OFFICE
CERTIFICATE OF CORRECTION

PATENT NO. : 4,217,128

DATED : August 12, 1980

INVENTOR(S) : John M. Stinson, Horace C. Mann, Jr., and John F. McCullough

It is certified that error appears in the above-identified patent and that said Letters Patent are hereby corrected as shown below:

Column 4, line 16, change "$R_2O_3; P_2O_5$" to -- $R_2O_3:P_2O_5$ --
line 34, change "improviding" to -- improving --
line 59, change "form" to -- foam --

Column 6, line 31, change "axide" to -- oxide --
line 41, change "Poyer" to -- Poynor --

Column 7, line 7, change "$P_2P_5$" to -- $P_2O_5$ --

Column 8, line 60, change formula to read as follows --

$$\bar{n}[CO(NH_2)_2 \cdot H_3PO_4] \rightarrow (NH_4)_{\bar{n}}H_2P_{\bar{n}}O_{3\bar{n}+1} + CO(NH_2)_2 + (\bar{n}-1)CO_2 + (\bar{n}-2)NH_3$$ --

Column 15, table III,
under the heading "$SO_4$", last item, change "0.01" to -- 0.1 --
opposite "Source" change heading "W.T. solids" to -- W.I. solids --

Column 18, line 17, change "produced" to -- producing --
line 43, change "unrea-" to -- urea- --

Column 21, line 12, change "highpurity" to -- high-purity --

Column 22, line 28, change "ureaammonium" to -- urea-ammonium --

Signed and Sealed this

Second Day of December 1980

[SEAL]

Attest:

SIDNEY A. DIAMOND

Attesting Officer

Commissioner of Patents and Trademarks